United States Patent

Routson

[15] 3,687,200

[45] Aug. 29, 1972

[54] METHOD FOR CONTROLLING FLOW OF AQUEOUS FLUIDS IN SUBTERRANEAN FORMATIONS

[72] Inventor: Willis G. Routson, Walnut Creek, Calif. 94598

[73] Assignee: The Dow Chemical Company, Midland, Mich.

[22] Filed: June 8, 1970

[21] Appl. No.: 44,609

[52] U.S. Cl................166/275, 61/36 R, 166/295, 175/72
[51] Int. Cl.......E02d 3/14, E21b 21/04, E21b 43/22
[58] Field of Search......166/295, 268, 275, 274, 300, 166/305 R; 61/36 R; 175/72

[56] References Cited

UNITED STATES PATENTS

| | | | |
|---|---|---|---|
| 2,238,930 | 4/1941 | Chamberlain et al.......166/300 UX | |
| 2,747,670 | 5/1956 | King et al................166/292 X | |
| 2,990,881 | 7/1961 | Nathan et al..........166/300 X | |
| 3,013,607 | 12/1961 | Bond et al..............166/270 X | |
| 3,396,790 | 8/1968 | Eaton....................166/300 X | |
| 3,530,937 | 9/1970 | Bernard.....................166/270 | |

*Primary Examiner*—Stephen J. Novosad
*Attorney*—Griswold & Burdick and Richard W. Hummer

[57] ABSTRACT

The formation of colloidal, water-insoluble, inorganic compounds in the presence of high-molecular-weight organic polyelectrolytes in dilute aqueous solution provides aqueous compositions having improved resistance to flow through porous subterranean formations. The use of these compositions provides a method for diminishing or shutting off water production in oil wells, for controlling the mobility of aqueous fluids in zones of higher permeability in such formations and for plugging subsurface leaks as in earthen dams. This method provides a useful adjunct in the control of thief zones in oil well drilling and in secondary recovery of petroleum by water flooding techniques.

10 Claims, No Drawings

3,687,200

METHOD FOR CONTROLLING FLOW OF AQUEOUS FLUIDS IN SUBTERRANEAN FORMATIONS

BACKGROUND OF THE INVENTION

The problems associated with unwanted intrusion of water underground, as in mines, are well known. Similar problems are encountered in leakage through earth dams and in the concurrent production of oil and water from oil wells. The presence of water in the oil may be traced to any one or more of a number of different causes including water-coning, water-fingering, and fractures communicating with water sources. In addition to the aforementioned causes of water production, which generally occur as the result of the mode of producing the well, water may be produced simply as the result of the oil well bore hole traversing water-bearing strata. Conditions conducive to water production are more fully elaborated in U.S. Pat. No. 3,032,499.

The mentioned patent is but one among many proposing treatments to block the water producing courses, leaving the oil-bearing formation in a condition such that oil production is readily resumed. In general, techniques heretofore proposed have suffered from one or more faults in that they were not sufficiently selective for the plugging of water courses or that they require for operation special conditions seldom encountered in actual practice. A further problem with prior methods results from the fact that they were either too permanent or not permanent enough, the former making mistakes uncorrectable and the latter rendering the benefits of the treatment of little value over extended periods of production.

Related problems are encountered with so-called "thief" zones which deplete the drilling fluid when such zones are traversed during the drilling of oil wells. Similarly strata having high permeability to water are frequently encountered adjacent to oil-bearing formations and thereby reduce the efficiency of secondary oil recovery by water-flooding techniques.

In a recent patent (U.S. Pat. No. 3,087,543) water production in oil-producing wells is inhibited by introducing into the oil well bore a solution of a water-soluble acrylamide carboxylic acid copolymer. Under pressure, this polymer solution is forced into the formation reducing the permeability of the formation to water with little or no decrease in the permeability of the same formation to oil. While numerous advantages are cited for the treatment, any beneficial effects achieved can only last for a relatively short time because of the inherent water solubility of the polymer.

It is an object of the present invention to provide a new method for selectively blocking, or reducing, the production of aqueous fluids in an oil well. More particularly, it is an object to provide a substantially water-impermeable block in water-producing strata while at the same time leaving oil-producing strata effectively unhindered for oil production. A further object is to provide compositions for controlling the mobility of aqueous fluids in highly permeable subterranean strata. A special object is to provide a water-blocking technique which can be reversed, if desired, so that any portion, or all, of the formation treated can be returned to its initial condition as regards permeability to fluid flow. These objects, and other benefits as will become apparent hereinafter, are accomplished in the present invention.

SUMMARY OF THE INVENTION

The present invention is directed to employing certain colloidal compositions for controlling the flow of aqueous fluids in permeable subterranean formation. More particularly, the invention involves methods employing compositions comprising aqueous dispersions of the reaction product of certain organic polymeric polyelectrolytes and a colloidal, water-insoluble, inorganic compound and especially methods employing such compositions for treating porous subterranean formations.

In general the organic polymeric polyelectrolytes employed in the compositions of the present invention are known flocculating agents for finely divided, water-insoluble, inorganic solids. Thus, it would be expected that the addition of a dilute solution of one of the organic polymeric polyelectrolytes to a colloidal dispersion of water-insoluble inorganic solids would result in the flocculation and agglomeration of said solids. Surprisingly, however, when a colloidal dispersion of one of the water-insoluble inorganic solids of the invention is formed in a suitable aqueous solution of one of said organic polymeric polyelectrolytes, flocculation and agglomeration do not occur but instead a stable, aqueous dispersion composition is obtained. Depending upon the concentration and nature of the polymeric polyelectrolyte and of the particular colloidal inorganic solid employed, the aqueous dispersion compositions of the invention may vary in consistency from liquids somewhat more viscous than the polymer solutions used in their manufacture to thick slimes or pultaceous gels. In any case, however, the compositions are adapted to be pumped or forced into porous subterranean formations and for such use are characterized by resistance factors, as hereinafter defined, which factors are increased with respect to the polymer solutions from which the compositions are prepared.

U.S. Pat. No. 3,399,725 discloses that aqueous solutions of certain water-soluble polymers, including the organic polymeric polyelectrolytes employed in the present invention, display an unexpected "resistance property" when such solutions are pumped into compact, microporous subterranean formations. As previously pointed out, the aqueous dispersion compositions of the present invention are characterized by a "resistance factor" greater than the resistance factor for the solution of polymer alone. For purposes of the present specification and claims, the term "resistance factor" is defined as the ratio of the pressure drop across a standard sandstone core for a constant rate of flow of an aqueous composition containing additives under test to the pressure drop across the same core with the same rate of flow for an aqueous 3 percent brine solution without additives. As herein employed all resistance factors were determined in a core of Berea sandstone cut in the form of a right circular cylinder having a diameter of 1 inch and an axial length of 1 inch. This sandstone core had a permeability to air of about 100 millidarcies. The core was mounted in a suitable holder to provide for measurement of controlled flow through the core in the axial direction. All aqueous compositions tested were made up in 3 percent sodium chloride brine to avoid internal changes in the sandstone induced by a change in ionic environment.

In their broadest scope, the compositions employed in the method of the present invention are those aqueous dispersions wherein a stable colloidal dispersion of a water-insoluble inorganic solid is formed in an aqueous solution of a water-soluble, synthetic organic polymeric polyelectrolyte, wherein said polyelectrolyte would normally flocculate said inorganic solid if the dispersion thereof had not been formed in the presence of said polyelectrolyte and wherein the finished aqueous composition is characterized by a resistance factor greater than the resistance factor for an aqueous solution containing the same concentration of polymeric polyelectrolyte without said inorganic solid. Preferred inorganic solids for use in the compositions of the invention include the sulfides of iron, copper, nickel, mercury, zinc, cadmium, cobalt, tin and lead and the hydroxides of aluminum, chromium, iron, cadmium, cobalt, nickel, copper, tin and zinc. The exact physical nature of these so-called colloidal dispersions is not completely understood since there appears to be an interaction of the inorganic compound with the polymeric polyelectrolyte causing marked effects on the rheological properties of the finished dispersions.

The water-soluble, synthetic organic, polymeric polyelectrolytes, employed in the compositions of the invention, are in general known flocculating agents characterized as substantially linear, high-molecular-weight polymers having sufficient polar groups in or along the polymer chain to render the polymer water-soluble. In the present context, high molecular weight means that the polymers have molecular weights of at least about one million and preferably of over two million. In practice it is preferred to employ water-soluble polymers characterized by a viscosity of at least 4 centipoises, preferably at least 12 centipoises, for a 0.5 percent by weight solution of the polymer in distilled water at 25° C. Representative polymeric polyelectrolytes useful in the invention are water-soluble polymers of acrylamide, acrylic acid, sodium styrenesulfonate and the like and copolymers of such monomers with each other or with other suitable monoethylenically unsaturated monomers such as ethylene, propylene, styrene, methacrylic acid, methacrylamide, vinyl alkanoic esters, vinyl chloride, maleic anhydride and the like. Other suitable polymeric polyelectrolytes are the polymers and copolymers of sodio-sulfoalkyl acrylates and methacrylates, aminoalkyl acrylates and methacrylates and water-soluble salts of copolymers of maleic anhydride with a vinyl-aromatic compound. The preferred polymeric polyelectrolytes are high-molecular-weight polyacrylamides and hydrolyzed polyacrylamides.

In preparing the compositions of the invention any suitable method for generating the colloidal, water-insoluble, inorganic compound may be employed provided said compound is formed in an aqueous solution of the water-soluble organic polymeric polyelectrolyte. In one method of producing the water-insoluble, inorganic compound, a double decomposition reaction is employed. For example, a soluble compound embodying a suitable anion, such as a sulfide or hydroxide ion, is dissolved in the aqueous solution of polymeric polyelectrolyte and an aqueous solution of a salt of a metal precipitatible by said anion is added thereto gradually and with sufficiently vigorous mixing to avoid excessive local concentrations of metal ions in the mixture. Alternatively the colloidal inorganic compound can be formed in the solution of polymeric polyelectrolyte by an oxidation or reduction reaction or by altering the pH of a suitable metal salt solution.

In practice, the compositions are generally produced by first preparing by known methods a dilute solution of one of the organic polymeric polyelectrolytes in water or in a suitable inert salt solution such as an oilfield brine and adding thereto a precipitant, such as hydrogen sulfide or sodium sulfide. To the resulting solution a dilute solution of a salt of a metal precipitatible by said precipitant is added gradually with stirring to form the colloidal, water-insoluble, inorganic compound in the presence of the polymeric polyelectrolyte. Thus, for example, a high molecular weight, water-soluble polyacrylamide or hydrolyzed polyacrylamide is dissolved in aqueous 3 percent sodium chloride brine to produce a solution containing at least about 0.005 percent by weight, and preferably from about 0.01 to about 0.1 percent by weight, of polymer and sufficient sodium sulfide is dissolved in the resulting solution to provide from about 2 to about 5 parts by weight of sulfide ion per million parts by weight of solution. To the sulfide-containing polymer solution there is added dropwise with stirring a dilute aqueous solution, generally containing from about 0.05 to about 0.2 percent by weight of metal ion, of a soluble salt of a metal which forms an insoluble sulfide, as, for example, a salt of iron, copper, nickel, mercury, zinc, cadmium, cobalt, tin or lead, to produce a stable colloidal dispersion of the corresponding insoluble metallic sulfide. Similarly a small amount of an alkali metal hydroxide or of an alkaline buffer can be dissolved in the polymer solution and thereafter a dilute solution of a suitable metallic salt, such as a soluble salt of aluminum, chromium or zinc, is added thereto to precipitate the corresponding metal hydroxide, such as, respectively, aluminum, chromium or zinc hydroxide, in the form of a stable, colloidal dispersion of the insoluble metal hydroxide. In large scale operations, the polymer solution containing the anionic precipitant can be prepared batchwise or continuously and the metallic salt solution be pumped into a stream of the polymer solution in a suitable conduit wherein natural or induced turbulence provides for proper mixing to generate the desired colloidal dispersion of insoluble, inorganic compound in the flowing stream of polymer solution. In this manner the colloidal dispersion can be formed in situ immediately before introducing same into a subterranean, porous formation.

In certain cases it is convenient to prepare compositions of the invention wherein the colloidal inorganic compound is generated in the presence of the polymer by more complex reactions such as oxidation or reduction. For example, it has been found that compositions embodying chromic hydroxide are conveniently prepared by adjusting the pH of a suitable solution of polymeric polyelectrolyte to a value in the range of 6.5 to 8.5, and adding an alkali metal chromate to the solution followed by a strong reducing agent such as sodium hydrosulfite to generate chromic ions in situ, which then form the desired colloidal chromic hydroxide sol. Alternatively hydroxide precipitates can be formed by first adjusting the pH of the polymer solution to a low value, then dissolving a small quantity of a soluble salt of the metal to be precipitated in said solution and thereafter adjusting the pH upward until the desired metal hydroxide separates as a colloidal dispersion composition.

From the foregoing it will be apparent that in certain cases the compositions of the invention can be generated inside a subterranean formation. Thus, for example, if it is found that the connate water in the formation contains soluble sulfide ions it may be possible to inject a solution of a metallic salt in an aqueous solution of polymeric polyelectrolyte into the formation and form the colloidal, insoluble, metallic sulfide in the interstices of the formation. In most cases, however, uncertainties as to uniformity of the connate water and as to the rate of mixing of the injected solution with the connate water would render such procedure questionable except in specialized situations.

The concentrations of ingredients in the colloidal dispersion compositions may vary depending upon the degree of fluidity desired and the permeability and porosity of the subterranean formation to be treated. In general, the compositions should contain at least 0.005 percent by weight of at least one organic polymeric polyelectrolyte and may contain up to an amount of such polymer which precludes proper mixing of other ingredients by reason of the viscosity of the polymer solution. Preferably the compositions contain from about 0.01 to about 0.1 percent by weight of the polymeric polyelectrolyte. Any suitable amount of the colloidal, water-insoluble, inorganic compound can be employed provided such amount is sufficient to produce the desired increase in the resistance factor of the finished composition. In general, such finished compositions will contain at least about 0.5 part by weight and preferably from about 1 part to about 80 parts by weight of colloidal, water-insoluble, inorganic compound per million parts by weight of finished dispersion composition. The concentration of inorganic compounds in the finished composition is, of course, only a minor proportion of the concentration of the polymer therein.

In its simplest form, the process of the invention is accomplished by injecting one of the aforesaid aqueous dispersion compositions into a permeable subterranean formation in any suitable fashion. In a preferred mode of operation, the aqueous dispersion composition is injected into an oil well bore hole from whence it flows into the adjacent formation. The extent of mobility control in the water-bearing or permeable formations is manifestly influenced by the differential permeability and porosity of various portions of the formation, by the resistance factor of the particular composition, by the pressure on the injected fluid and by the duration of the treatment.

The selectivity of the treatment on oil-bearing formations results from the greater effect of the dispersion on the mobility of water in the formation than its effect on oil. In some cases it may be preferred to employ a packer or other means of causing localized injection of the dispersion. Such other means include the process for selectively treating oil bearing formations described in U.S. Pat. No. 3,115,930. Another is the technique involving pressurizing the formation, releasing the pressure and producing aqueous fluids, whereby the aqueous fluids are produced at a faster rate than the oil and thus after a brief period the water-bearing portions of the formation possess a negative energy potential in relation to the oil-bearing portions thereof. Such an energy differential promotes selective uptake of the dispersion composition in the water-bearing portions of the formation.

Regardless of the means adopted to insure, or promote, selectivity of injection of the water blocking dispersion into the water zone, or zones, it is desirable to employ a brief acid wash following the plugging treatment if the treated will is to be used for producing oil. Under acid conditions the colloidal reaction product described above can usually be dispersed and fluidized in water after contact with the formation. The acid wash in effect involves injecting acid into the formation to remove any plugging agent that may have penetrated the oil zones without entirely removing the plug in the water zone in which the plug has formed to a greater depth than in the oil zone as a result of the greater permeability of the water zone to the treating aqueous dispersion. In the case of treatment of injection wells in a field in which water-flooding is contemplated or in progress, the acid wash procedure is generally unnecessary or even detrimental.

In the plugging of other permeable zones such as leaks in earthen dams, the colloidal dispersion may be generated and placed in a position to be carried into the porous formation or channels by the natural flow of water through the leaking zone. In one method of operation, the colloid dispersion composition is prepared in a solution of sufficiently high specific gravity so that the composition can be allowed to flow down the upstream face of the dam and thereby seek out and penetrate the zones wherein leakage is occurring.

The following examples illustrate the invention but are not to be construed as limiting the same.

EXAMPLE 1

A high-molecular-weight hydrolyzed polyacrylamide characterized by a viscosity of about 14 centipoises at 25° C. for a 0.3 percent by weight solution thereof in aqueous 4 percent sodium chloride solution adjusted to a pH of 7 and having about 22 percent of the original carboxamide groups hydrolyzed to sodium carboxylate groups, is dissolved in deionized water to produce a stock solution containing 0.1 percent by weight of polymer. A solution of aluminum chloride in deionized water is treated with sodium hydroxide in an amount to convert the aluminum to the form of sodium aluminate at a final pH of 11.5 and the resulting clear solution diluted to provide a solution containing 1,000 parts by weight of aluminum per million parts of solution. 20 milliliters of the stock solution of polymer is diluted to 100 milliliters with tap water to produce a solution containing 0.02 percent by weight of polymer at a pH of about 9 and 4 milliliters of the above sodium aluminate solution added thereto portionwise with good mixing. The resulting mixture has a pH of 10.0 and will pass through a screen of 200 meshes to the inch when poured onto said screen. Acid is added to said mixture to adjust the pH to 8.5 to precipitate a colloidal dispersion of aluminum hydroxide containing about 40 parts of aluminum by weight per million parts of composition. This aqueous dispersion composition is found to be stable on standing and plugs a screen of 200 meshes to the inch when poured thereon.

EXAMPLE 2

Following the general procedure of Example 1, 4 milliliters of a chromic chloride solution containing 1,000 parts of chromium per million parts (ppm) of solution is mixed with 96 milliliters of an aqueous solution of 0.02 percent by weight of the polymer of Example 1 adjusted to pH 3.5 and the resulting slightly acid solution treated with sodium hydroxide solution to adjust the final composition to pH 8.5. The resulting aqueous, colloidal dispersion containing about 40 ppm of chromium as insoluble chromic hydroxide is slightly cloudy and plugs a 200 mesh per inch screen when poured thereon.

EXAMPLE 3

In a Canadian oil field in which secondary oil recovery is being attempted employing a solution of a high-molecular-weight partially hydrolyzed polyacrylamide as the driving fluid it is found that a portion of the formation is so highly permeable that the polymer solution bypasses from the injection wells to the producing wells without accomplishing the desired areal sweep of the oil. One of the injector wells is found to be taking large quantities of polymer solution with a well-head pressure of only 40 pounds per square inch. The polymer solution employed contained about 750 parts by weight of a hydrolyzed polyacrylamide, similar in characteristics to that described in Example 1, per million parts of the aqueous brine employed for the waterflood, said polymer being available commercially from The Dow Chemical Company under the trademark Pusher 700. Prior to introducing the polymer into the solution the latter is treated by introduction of sodium hydrosulfite ($Na_2S_2O_4$) to remove oxygen therefrom and to leave an excess of about 20 parts by weight of hydrosulfite per million parts of injection fluid. A treating solution is prepared by dissolving potassium dichromate in water at a concentration of 0.5 pound per gallon and said treating solution is metered into the polymer solution at the well head at a rate to provide 40 parts by weight (equivalent to about 14 parts by weight of chromic ion) per million parts of the flooding medium. The hydrosulfite reduces the chromate to chromic ion, in situ, which thereupon forms the desired chromic hydroxide colloid in the presence of the polymer. Injection is continued for a period of 2 weeks at a rate of from 170 to 280 barrels of polymer solution plus chromate per day. During this period the well-head pressure rises from 40 psi to over 300 psi. Feeding of chromate is then discontinued but the well-head pressure remains at a desirably high level during subsequent injection of polymer solution thus indicating control of mobility in the excessively permeable zone in the subterranean formation.

EXAMPLE 4

In a Texas oil field under waterflood it is found that there is a zone of excessive permeability whereby fluid injected into an injection well is detectable in the nearest off-set producer within a few hours after injection. The water cut in said producer is high and oil production is low. Injection fluid consisting of a solution of hydrolyzed polyacrylamide in oil field brine is prepared using a polymer similar to that of Example 1 at a concentration of about 1,000 parts by weight per million parts of fluid. Hydrochloric acid is added to maintain the PH of the fluid in the range of 4 to 6. At the initiation of injection this injector well shows a vacuum rather than pressure at the well head. A treating solution is prepared consisting of an acidified aqueous solution of aluminum sulfate and the latter is injected into the polymer solution at the well head at a rate to provide about 10 parts by weight of aluminum ion per million parts of polymer solution to form an aluminum hydrate colloid complex therein. The polymer solution is fed to the well at a rate of about 1,200 barrels per day. After such injection for about 3 days, positive pressure at the well head is detectable and after about 10 days of injection of the polymer-colloid composition the wellhead pressure rises to 60 psi. Meanwhile the fluid level in the offset producer has decreased by 25 percent. When the producer is pumped down and allowed to produce further fluids it is found that the water cut is only one-half that before treatment. Over the next several weeks the polymer injection is continued at a reduced concentration of 310 ppm while oil production from the offset producer improves five fold.

EXAMPLE 5

The level of a water-storage pond behind an earth dam in California had been dropping at an excessive rate due to leaks near the base of the dam. An aqueous solution containing 500 parts by weight of an acrylamide polymer per million parts of solution is prepared in 0.3 percent sodium chloride brine. The polymer is a polyacrylamide having about 20 percent of the carboxamide groups hydrolyzed to carboxylate groups and is characterized by a viscosity of about 19 centipoises for a 0.5 percent by weight solution, thereof in water at a temperature of 25° C. The polymer solution is pumped to the upstream face of the dam and just before application sufficient chromic chloride solution is mixed with the polymer solution to provide 20 parts by weight of chromic ion per million parts of polymer solution to form a colloid complex with the polymer. The resulting colloid complex composition is flowed down the upstream face of the dam in the areas where the leaks originate so that the flow of water will carry the metal-polymer complex composition into the permeable zones through the dam. The following day it is found that leakage through the dam has essentially ceased.

EXAMPLE 6

A right circular cylinder of Berea sandstone one inch in diameter and one inch long was mounted in a suitable holder fitted for determining pressure drops when fluids were pumped therethrough. The core had a permeability of about 100 millidarcies. The resistance factors for various compositions of the invention were determined by passing the compositions through the core at a constant rate and determining the pressure drop for each composition as compared to the pressure drop for a 3 percent by weight sodium chloride brine. Each of the compositions was made up in 3 percent brine to avoid alteration of the sandstone. A solution containing 0.05 percent by weight of hydrolyzed polyacrylamide of high molecular weight was found to have a resistance factor of 5.6. When sodium sulfide was added to the polymer solution to provide 3 parts by weight of sulfide ion per million parts of solution and dilute mercuric salt solution added dropwise with stirring to form colloidal mercuric sulfide, the resistance factor of the resulting composition was found to be 16.5. Similar results were obtained with zinc and cadmium sulfides in the 0.05 percent polymer solution and with ferrous sulfide at 0.5 ppm of iron in a 0.01 percent by weight solution of the polymer.

What is claimed is:

1. The method for controlling mobility of aqueous fluids in subterranean formations which comprises injecting into a porous subterranean formation through a well bore penetrating said formation an aqueous colloidal dispersion of a water-insoluble, inorganic compound prepared in an aqueous solution of a synthetic organic polymeric polyelectrolyte.

2. A method according to claim 1 wherein the polymeric polyelectrolyte is employed at a concentration of from about 0.01 to about 0.1 percent by weight of the solution.

3. A method according to claim 1 wherein the water-insoluble, inorganic compound is employed at a concentration of from about 0.5 part by weight to about 80 parts by weight per million parts by weight of finished dispersion composition.

4. A method according to claim 1 wherein the water-insoluble, inorganic compound is a sulfide of iron, nickel, copper, mercury, zinc, cadmium, cobalt, tin or lead or a hydroxide of aluminum, chromium, cadmium, cobalt, nickel, copper, tin or zinc.

5. A method according to aim 4 wherein the polymeric polyelectrolyte employed is a polyacrylamide or hydrolyzed polyacrylamide.

6. A method according to claim 1 wherein the polymeric polyelectrolyte is polyacrylamide or a hydrolyzed polyacrylamide.

7. A method according to claim 1 wherein the aqueous colloidal dispersion is introduced into the subterranean formation through a well bore penetrating said formation and forced toward at least one other well bore penetrating said formation.

8. A method according to claim 1 wherein the inorganic compound is aluminum hydroxide and the polymeric polyelectrolyte is a hydrolyzed polyacrylamide.

9. A method according to claim 1 wherein the inorganic compound is chromium hydroxide and the polymeric polyelectrolyte is a hydrolyzed polyacrylamide.

10. A method according to claim 1 wherein the colloidal dispersion is emplaced along the upstream face of an earthen dam and injected into porous passages in said dam by the pressure of the water contained therein.

* * * * *